Nov. 12, 1929.  Z. S. TAYLOR  1,735,517
BALANCE INDICATOR FOR GOLF CLUBS
Filed Jan. 9, 1928
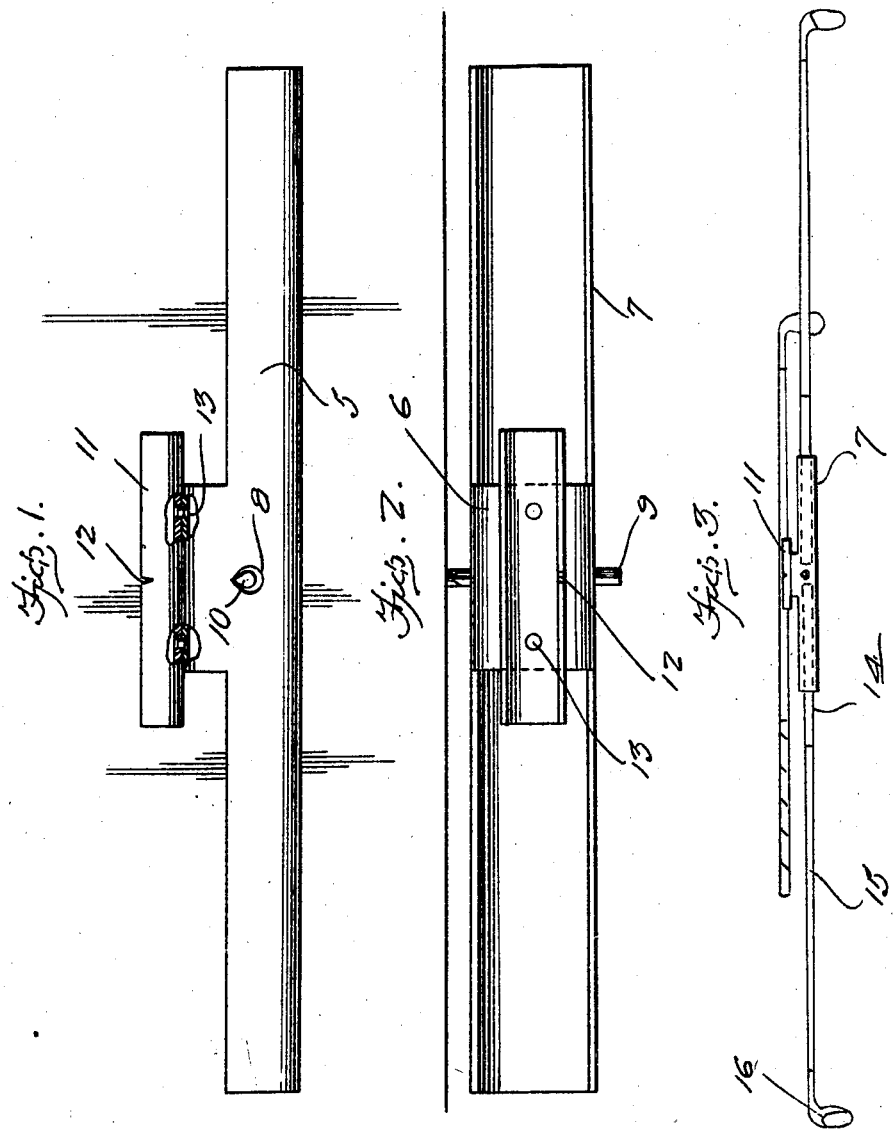
Inventor
Z. S. Taylor
By Clarence A. O'Brien
Attorney Patented Nov. 12, 1929

1,735,517

UNITED STATES PATENT OFFICE.

ZEBULON S. TAYLOR, OF NEW YORK, N. Y.

BALANCE INDICATOR FOR GOLF CLUBS

Application filed January 9, 1928. Serial No. 245,477.

The present invention relates to indicators for determining and checking the balance of golf clubs and has for its object to provide a pair of balance indicating units, one of said units being adapted for checking the balance of iron clubs and the other of said units being adapted for checking the relative weights of a pair of wooden golf clubs.

Another object of the invention is to provide a device of this character enabling the relative weight of various types of game devices to be determined, regardless of the length, size or dimension of the respective devices.

A still further object is to provide a device of this character of simple and practical construction, which is efficient and reliable in performance, which is readily portable and which may be easily and conveniently carried from place to place for attaching in operative position, upon any horizontally disposed object, relatively inexpensive to manufacture and otherwise well adapted to the purpose for which the same is intended.

Other objects and advantages reside in the special construction and combination of the various elements comprising the invention, reference being had to the accompanying drawings forming a part hereof, wherein:—

Figure 1 is a side elevational view of the device in attached position,

Figure 2 is a top plan view thereof,

Figure 3 is a side elevational view showing the manner in which the balance and weight indicating unit may be utilized for determining the balance and relative weight of golf clubs.

Referring to the drawings in detail, the invention comprises a trough shaped holder 5 having a bridge 6 formed intermediate its ends and connected at each side with the upper edges 7 of the holder, said holder also having an opening 8 extending transversely thereof at its exact center.

The opening 8 is adapted to receive a pin 9 which may be attached at one end in any suitable manner to a fixed object and disposed outwardly therefrom in a horizontal plane. The upper portion of the pin is formed into a knife edge as indicated at 10 whereby to reduce the area of the opening 8 which is engaged with the pin in supporting relation.

Upon the bridge 6 is mounted a relatively smaller trough shaped holder 11 having its upper portion entirely open and having a notch 12 cut in one of its upper edges and disposed at an exact vertical plane with respect to the center of the opening 8. The holder 11 may be permanently secured to the bridge 6 by means of rivets, bolts or screws 13 or other similar fastening devices.

Each end of the holder 5 is adapted to receive the handle of a game device, such as for instance a golf club as indicated at 15 with the end of the handle extending slightly under the bridge portion 6 and the head 16 of the club extending outwardly of the holder, the club being prevented from displacement from the holder by reason of the engagement of the inner end of the handle with the bridge. By placing a club in each end of the holder 5 in a manner as illustrated in Figure 3 of the drawings it is apparent that the relative weight between the clubs may be readily determined by observing any tilting action which may occur in the holder by reason of an increase in the weight of one of the clubs over the other.

The relative balance between the head of the club and the shaft may be determined by placing the shaft of the club within the holder 11 and observing the center of gravity of the shaft which occurs opposite the notch 12 when the holder is maintained in a balanced condition with the club therein.

The proper point of balance between the ends of the club should occur at approximately a distance of one-third from the heel of the head of the club to the opposite end of the shaft and the balance of the club may thus be determined by comparing such points with the portion of the shaft which registers with the notch 12 of the holder.

While I have illustrated the invention as adapted for use in determining the relative weight and balance of golf clubs it is apparent that the device may be also used in a similar manner for determining the relative weights and balance of other game devices, such as for instance tennis rackets, baseball bats and other articles employing a swinging movement during the use thereof.

It is obvious that the invention is susceptible of various changes and modifications, without departing from the spirit or scope of the invention or sacrificing any of its advantages; and I accordingly claim all such forms of the device to which I am entitled.

Having thus described my invention, what I claim as new is:

1. A device of the class described comprising a plurality of article holders arranged in superimposed relation and providing individual supports one of said supports being adapted for supporting a pair of articles at their opposite ends and means for supporting the holders in balanced position intermediate their ends.

2. A device of the class described comprising a plurality of holders of trough shaped formation and arranged in superimposed relation, each of said holders providing individual supports for objects arranged at the ends thereof and means arranged equidistantly between the ends of the holders for supporting the same in balanced position.

3. A device of the class described comprising a trough shaped holder having a bridge formed intermediate its ends and extending between the upper edges thereof, a similarly formed holder mounted upon said bridge portion, said last named holder and each end of said first named holder providing individual article supporting means, said first named holder having an opening extending transversely therethrough equidistantly between the ends thereof and adapted for receiving a pin for supporting the holder in a balanced position and said last named holder having a notch formed in one of its upper edges in vertical alinement with the center of said opening.

In testimony whereof I affix my signature.

ZEBULON S. TAYLOR.